Jan. 31, 1967   SHUJI KIMURA   3,301,627
CAMERA HANDGRIP INTERNALLY PROVIDED WITH ELECTRICAL CELLS
Filed Oct. 5, 1964   3 Sheets-Sheet 1

INVENTOR.
SHUJI KIMURA
BY
ATTORNEY

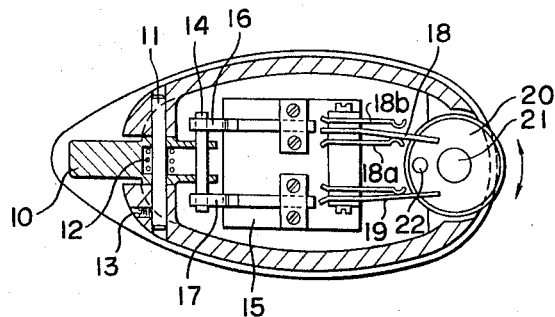
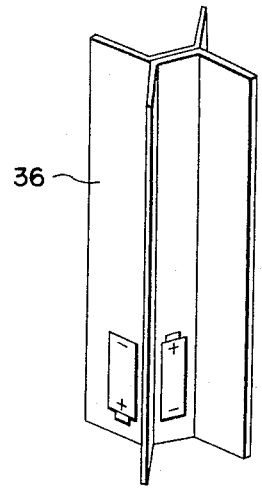
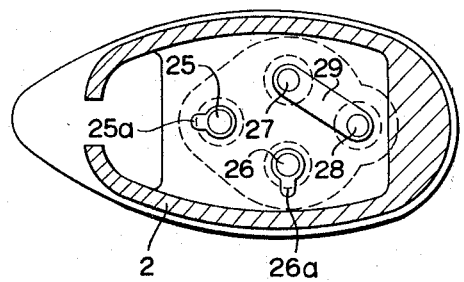
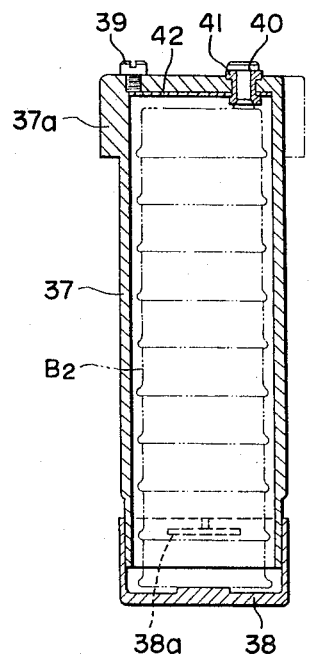
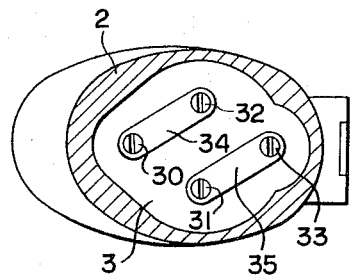
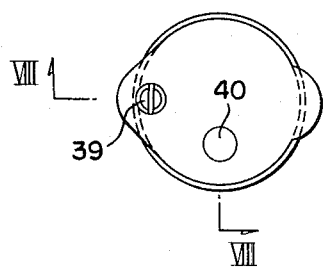

Jan. 31, 1967  SHUJI KIMURA  3,301,627
CAMERA HANDGRIP INTERNALLY PROVIDED WITH ELECTRICAL CELLS
Filed Oct. 5, 1964  3 Sheets-Sheet 3

INVENTOR.
SHUJI KIMURA
BY
ATTORNEY

United States Patent Office 3,301,627
Patented Jan. 31, 1967

3,301,627
CAMERA HANDGRIP INTERNALLY PROVIDED
WITH ELECTRICAL CELLS
Shuji Kimura, Yokohama-shi, Japan, assignor to Nippon
Kogaku K.K., Tokyo, Japan, a corporation of Japan
Filed Oct. 5, 1964, Ser. No. 401,623
Claims priority, application Japan, May 20, 1964
(utility model), 39/40,424
6 Claims. (Cl. 352—95)

This invention relates to a handgrip for a camera and more particularly to a camera handgrip for the storage of batteries and for the mounting of switches to control the operation of a camera mounted thereon.

Recently many cine-cameras, not excepting motorized cameras have associated therewith handgrips as a means for holding the cameras firmly in their appropriate phototaking positions. In consideration of effective mechanical maneuvering and convenient carrying, such handgrips are, in most instances, designed with internal chambers for the electrical source and switching and other means.

At the present time, besides conventional single dry cell of 1.5 volts, hereinafter referred to as "UM3," miniature and high quality cells as for example mercury or Ni-Cd cells, have conveniently been employed as the power sources. Ni-Cd cells deteriorate more slowly despite their miniature dimensions, and, in addition, may be recharged from a suitable voltage source. Ni-Cd cells are extremely practical as electrical sources for miniature type mechanical appliances, the only drawback in their use being the lack of universal availability. It is therefore desirable to alternatively use both of Ni-Cd and UM3 cells, the latter being universally available. It has been up to the present, impossible to use both types of cells in one handgrip, since they differ significantly from each other in size.

The present invention has for its object a handgrip for a camera wherein both types of cells may be used and in which a switching arrangement is provided for one hand operation of the camera secured thereto.

The invention will be best understood from the following description of a specific embodiment when read in connection with the accompanying drawing in which:

FIGS. 3 to 5 are cross sectional views, respectively, taken along lines III—III, IV—IV and V—V in FIG. 1;

FIG. 6 is a perspective view of a preferred form of a separator used in the embodiment of FIG. 1;

FIG. 7 is a top view of a cell case usable for the Ni-Cd type cells;

FIG. 8 is a vertical section of the cell case taken along line VIII—VIII of FIG. 7;

Figure 1:
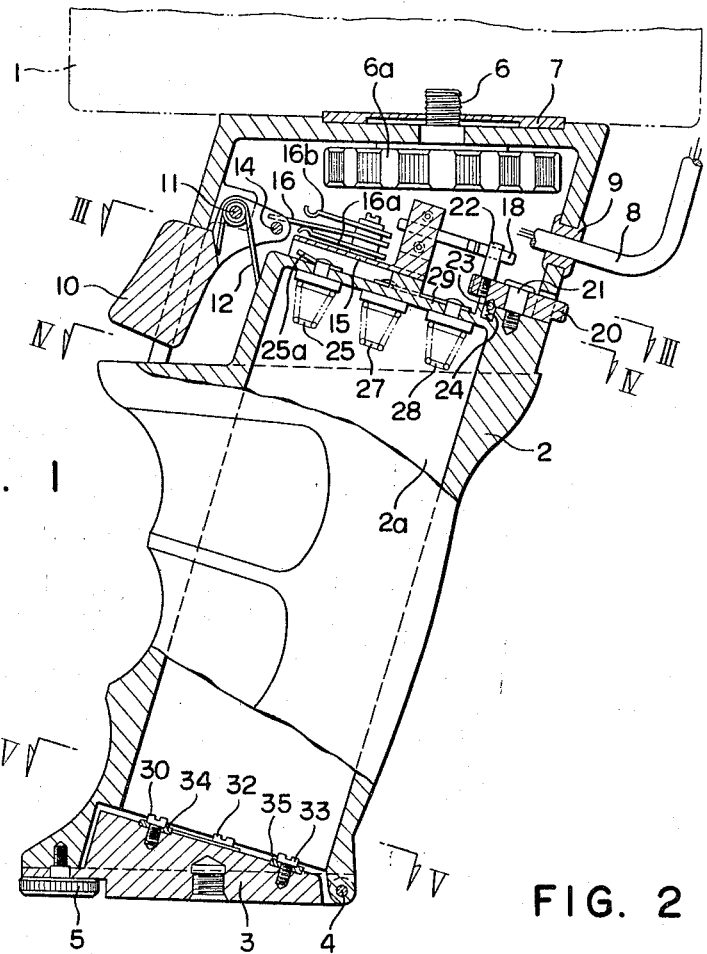
FIG. 1 is a side view, partially in section of an illustrative embodiment of a camera handgrip in accordance with the invention.

An illustrative embodiment of the invention will be described in detail with references being made to the appended drawing. In electrically motorized motion picture camera 1, motor 1a winds up the film feed and operates the shutter for exposure (FIG. 11); the built-in switching lever 1b, at the moment the feed of a single frame of the film is completed, engages contact 1c while at the moment of complete operation of the shutter for exposure of this frame engages contact 1d opposite contact 1c.

Figure 2:
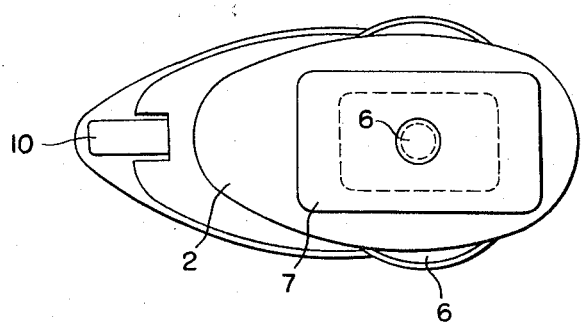
FIG. 2 is a top view thereof.
Figure 12:
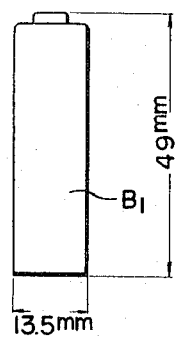

The handgrip 2, of insulating material such as synthetic resin, is formed with a chamber 2a, within which four UM3 dry cells $B_1$ can be housed. The UM3 cell is of 1.5 volts and has dimensions of about 13.5 mm., in diameter and about 49 mm., in height, as shown in FIG. 12. The bottom cover 3 is recoverably hinged on pin 4 and can be fixed to the body of handgrip 2 by use of disc-headed clamp screw 5. Another disc-headed clamp screw 6, arranged on the top of handgrip 2, is for removably affixing the handgrip to the camera body, the disc-head 6a of screw 6 partly protruding sidewise from handgrip 2, as illustrated in FIGURE 2, so that it can be manipulated from outside the body. Rectangular washer 7 about screw 6 is adapted to fit into a recess in the camera face to which the grip is attachable. A three wire cord 8 is electrically connected to camera 1, passing through a bushing 9 in a wall of grip 2.

A trigger lever 10, hereinafter simply as referred to as the "trigger," is rotatably mounted on a pin 11 and biased clockwise by a spring 12, a set screw 13 (FIG. 3), holding the pivot pin 11 in place. A pin 14 of insulating material is secured to the inwardly extending end of the trigger 10. A switch base board 15 of insulating material is secured within the handgrip and has four sets of spring switches 16 to 19 fixed thereon, as illustrated in FIGS. 1 and 3. The first switch 16 has two contacts 16a and 16b, the second switch 17 has two contacts 17a and 17b, the third switch 18 has two contacts 18a and 18b, and the fourth switch 19 is provided being for the locking purpose. A switching dial 20 at the back of the handgrip is rotatably mounted on a pin 21 and functions as a controller for the three different operations of the camera, viz., single frame operation, continuous filming, and the locking or stop operation. The dial has a vertically projecting switching pin 22 of insulating material on the upper surface thereof. Steel ball 23 is for click latching of the switching dial 20 in the desired operating position, a spring 24 biasing the ball upwardly to engage detents in the bottom face of the dial.

It will be apparent from the description thus far made, that the trigger 10 and the switching dial 20 are disposed at the upper end of the handgrip and on opposite sides thereof to permit one hand operation of the camera affixed thereto; the forefinger operating the trigger and the thumb operating the switching dial. Secured within the handgrip chamber 2a or two treminals 25 and 26 for connection to the battery supply, the two terminals being connected to the previously mentioned switch sets 16 to 19 through terminal strips 25a and 26a adjacent the baseboard 15. Two additional terminals 27 and 28 are also provided and connected to each other by conducting strip 29 (FIGS. 1 and 4). Terminals 25 to 28 have their contacts in the form of vertically elastic conical coil springs. Also provided is a bottom series of contacts 30 to 33, secured on bottom cover 3, and corresponds to the series comprising the terminals 25 to 28. Pairwise connections are completed by the use of a pair of conductive strips 34 and 35 (FIGS. 1 and 5).

A separator 36 (FIG. 6) is contoured as to be removably fitted into the handgrip chamber 2a. A casing 37 for holding a plurality of series connected mercury or Ni-Cd cells is provided and made of conductive material, its upper end 37a being shaped to be fitted into chamber 2a and its lower end cover 38 firmly fitted by means of a sawed slit 38a. Secured to the upper end of the casing 37 are two terminals 39 and 40 corresponding to terminals 25 and 26, the terminals 39 and 40 being insulated from the casing by a collar or sleeve 41 for the terminal 40 and a disc or wafer 42 for the interior of the casing, both elements being of insulating material.

Figure 9:
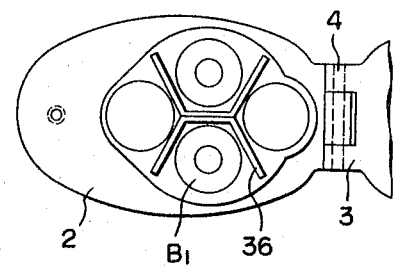
FIG. 9 shows a portion of the botom view of the handgrip of FIG. 1 showing four UM3 cells inserted within the handgrip.
Figure 10:
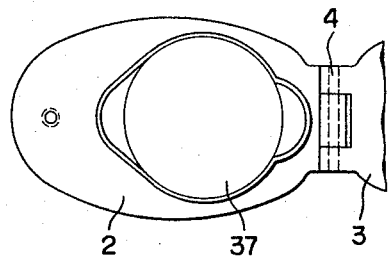
FIG. 10 shows a portion of the bottom view of the handgrip of FIG. 1 showing a Ni-Cd cell inserted within the handgrip.
Figure 11:
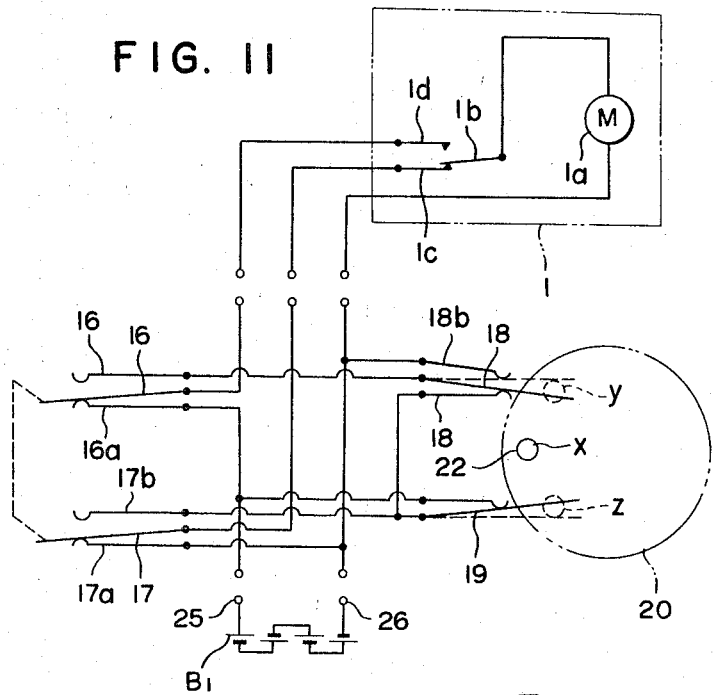
FIG. 11 is a diagram of the electrical connection of the switching mechanism.

As seen from the above description, when a series $B_1$ of dry cells of type UM3 is utilized as the electrical source, separator 36 is fitted in chamber 2a and thereafter, as illustrated in FIGS. 9 and 11, four dry cells $B_1$ are inserted therein in such fashion that their poles are connected to terminals 25 and 26, respectively. The required polarity positioning of cells $B_1$ is indicated within each cell channel of the separator 36 as shown in FIG. 6.

Figure 13:
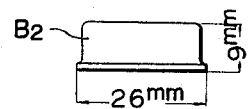
FIGS. 12 and 13 shows the approximate dimensions of UM3 cell and Ni-Cd cell, respectively.

When a series of Ni-Cd cells $B_2$ is used, a stack of these cells is inserted serially as in FIGURE 8, into casing 37 and the latter inserted into chamber 2a, so that terminals 39 and 40 engage terminals 25 and 26 within the chamber. The dimensions of Ni-Cd cells $B_2$ are about 26 mm., in diameter, and about 9 mm., in height, as shown in FIG. 13.

The handgrip 2 is now clamped to camera body 1 by means of disc-headed clamp screw 6, and cord 8 is electrically connected as illustrated in FIG. 11. Operation of the camera is initiated by positioning the switching dial 20 to the desired mode of operation and depressing the trigger 10. When continuous filming or running is desired, the switching pin 22 is positioned at $x$ in FIGURE 11, then trigger 10 is depressed which results in switching pin 14 pushing upwardly to close switch contacts 16, 16b and switch contacts 17, 17b being connected thereby to the positive side of the batteries through contacts 1c and 1d to energize the motor 1a for continuous operation. When a single factor is desired, the switching dial pin 22 is positioned at $y$, so that third switch 18 engages with its outer contact 18b. Upon the depression of the trigger 10, the switch contacts 16, 16b and contacts 17, 17b will close to be connected to the positive and the negative polarity of contacts 1c and 1d, respectively. The motor 1a is energized to initiate the filming operation which continues so long as switching lever 1b remains in contact with contact 1c, viz., until the moment of completion of shutter operation when lever 1b engages the other contact 1d and filming operation ceases. The restoration of trigger 10 to its original, non-depressed position results in the positive repolarization of contact 1d, the reenergization of motor 1a and the start of filming operation. It is noted that when switching pin 22 is moved to position $z$, locking switch 19 is opened and camera 1 does not operate even if trigger 10 is depressed.

As herein described, the present inventive design of camera handgrip offers many conveniences, since the electrical source chamber, internally provided with a switching device for single frame operation as well as continuous filming, is available both for cells of the UM3 type readily obtainable on the ordinary market and for those of the Ni-Cd type of high performance.

What I claim is:

1. A handgrip for motor driven cameras or motion picture apparatus selectively enabling the use of conventional types of dry cell and the mercury of nickel-cadmium type of cell, comprising a first chamber provided with trigger means and control means cooperative with switch means to selectively operate the camera either single frame operation, or continuous filming, or locking operation, a first pair of terminals within the first chamber, an electrical cord connecting the first pair of terminals to a motor within the apparatus or camera, a second hollow chamber provided with a first set of terminals at the top portion thereof and a second set of terminals at the bottom cover for the second chamber, the first and second sets of terminals being cooperative with said switch means and being so disposed that upon insertion into the second hollow chamber of conventional dry cells they are connected to the poles of the cells, and the second hollow chamber being adopted to have inserted therein a battery casing having a stack of mercury or nickel-cadmium type cells in seriatim, the battery casing, when inserted, cooperating with the said second set of terminals.

2. A handgrip according to claim 1, in which said trigger means and control means are provided at the opposite sides, respectively, of the first chamber.

3. Handgrip for a motor driven camera or motion picture apparatus selectively enabling the use of conventional types of dry cell and the mercury or nickel-cadmium type of cell, comprising a body member, a first chamber within said body for receiving a plurality of batteries, a second chamber within said body, a plurality of cooperating sets of electrical contacts in the second chamber, electrical terminal means in both chambers for interconnecting the batteries with the sets of electrical contacts, an electrical connection for connecting the batteries through selected sets of electrical contacts to a motor within the camera, a trigger pivotally mounted on the body and extending into the second chamber for actuating of at least one set of contacts upon depression, and a switching dial rotatably mounted on said body and extending into the second chamber for actuation of at least one other set of contacts, said switching dial being rotatably positionable in three possible positions for single frame operation, continuous operation, and non-operation of the camera secured to the handgrip upon depression of the trigger.

4. A handgrip according to claim 3, wherein the trigger and the switching dial are on opposite sides of the handgrip body.

5. A handgrip according to claim 2, wherein the first chamber is provided with a removable separator dividing the chamber into a number of compartments to receive conventional batteries therein, the interconnecting terminal means comprising two sets of terminals, the first set of terminals connecting the conventional batteries inserted in the compartments to the sets of contacts in the second chamber, and a removable battery casing for insertion into the first chamber for retaining series-connected stacked mercury or nickel-cadmium cells, the second set of terminals connecting the batteries in the casing to the sets of contacts in the second chamber.

6. A handgrip according to claim 5, wherein the removable battery casing is of conducting material, the handgrip body of insulating material, and terminals secured to and electrically insulated from the battery casing connect the series-connected batteries within the casing to the second set of terminals.

References Cited by the Examiner

UNITED STATES PATENTS

| | | | |
|---|---|---|---|
| 2,617,142 | 11/1952 | Cadwell et al. | 95—86 |
| 2,928,315 | 3/1960 | Broido | 95—86 |
| 3,071,639 | 1/1963 | Mendelson et al. | 136—173 |
| 3,085,127 | 4/1963 | Loris | 136—173 |
| 3,147,483 | 9/1964 | Hickl | 352—169 |
| 3,178,721 | 4/1965 | Kamp | 352—169 |
| 3,187,341 | 6/1965 | Kubota et al. | 352—243 X |

FOREIGN PATENTS 379,914   9/1964   Switzerland.

JULIA E. COINER, *Primary Examiner.*

NORTON ANSHER, *Examiner.*

V. A. SMITH, *Assistant Examiner.*